United States Patent
Zhang et al.

(10) Patent No.: US 10,528,655 B2
(45) Date of Patent: Jan. 7, 2020

(54) METHOD AND DEVICE FOR INPUTTING INFORMATION INTO AN ENTRY FIELD OF AN ELECTRONIC COMMUNICATION

(71) Applicant: Tencent Technology (Shenzhen) Company Limited, Shenzhen (CN)

(72) Inventors: Xiaolong Zhang, Shenzhen (CN); Yuejun Liu, Shenzhen (CN); Shuo Wang, Shenzhen (CN); Yonglong Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 981 days.

(21) Appl. No.: 14/306,824

(22) Filed: Jun. 17, 2014

(65) Prior Publication Data
US 2015/0095754 A1    Apr. 2, 2015

Related U.S. Application Data

(63) Continuation of application No. PCT/CN2014/075611, filed on Apr. 17, 2014.

(30) Foreign Application Priority Data

Sep. 29, 2013    (CN) .......................... 2013 1 0462103

(51) Int. Cl.
G06F 17/24    (2006.01)
G06F 17/27    (2006.01)

(52) U.S. Cl.
CPC .......... *G06F 17/243* (2013.01); *G06F 17/273* (2013.01)

(58) Field of Classification Search
CPC .. G06F 17/243; G06F 17/273; G06F 17/2247; G06Q 50/01; H04L 65/403
See application file for complete search history.

(56) References Cited

U.S. PATENT DOCUMENTS 6,603,489 B1 *   8/2003  Edlund ................ G06Q 10/109
                                                715/201
6,651,217 B1 *  11/2003  Kennedy ............... G06F 17/243
                                                715/224

(Continued)

FOREIGN PATENT DOCUMENTS

CN    101369272 A    2/2009
CN    102104843 A    6/2011

(Continued)

OTHER PUBLICATIONS

Office Action dated Mar. 20, 2017 for Chinese Application No. 201310462103.5, 7 pages.

(Continued)

*Primary Examiner* — Thu V Huynh
(74) *Attorney, Agent, or Firm* — Brinks Gilson & Lione

(57) ABSTRACT

A method and a device are provided for inputting account information in the field of Internet communications. The method includes: obtaining user account information included in a first application; obtaining an information type of a form element included in a form of a second application; determining account information corresponding to the form element according to the information type of the form element and the user account information; and automatically inputting the account information corresponding to the form element to the form element. The device includes a processor and a non-transitory storage medium, which includes: a first obtaining module, a second obtaining module, a determining module, and an inputting module.

13 Claims, 7 Drawing Sheets

(56) References Cited

U.S. PATENT DOCUMENTS

| | | | |
|---|---|---|---|
| 2002/0013788 A1* | 1/2002 | Pennell | G06F 17/243 |
| | | | 715/224 |
| 2002/0175940 A1* | 11/2002 | Lection | G06F 3/0482 |
| | | | 715/764 |
| 2003/0028792 A1* | 2/2003 | Plow | G06F 17/243 |
| | | | 713/193 |
| 2003/0233336 A1* | 12/2003 | Clark | G06F 17/30876 |
| 2005/0210022 A1* | 9/2005 | Philippe | G06F 17/22 |
| 2006/0200754 A1* | 9/2006 | Kablesh | G06F 17/243 |
| | | | 715/226 |
| 2008/0270253 A1* | 10/2008 | Huang | G06Q 20/04 |
| | | | 705/26.81 |
| 2013/0036172 A1* | 2/2013 | Chan | G06Q 50/01 |
| | | | 709/204 |
| 2013/0198598 A1* | 8/2013 | Kirsch | G06F 17/30899 |
| | | | 715/226 |

FOREIGN PATENT DOCUMENTS

| | | |
|---|---|---|
| CN | 102104846 A | 6/2011 |
| CN | 102111292 A | 6/2011 |
| CN | 102378175 A | 3/2012 |
| CN | 103036899 A | 4/2013 |
| KR | 10-2005-0052949 A | 6/2005 |

OTHER PUBLICATIONS

International Search Report and Written Opinion dated Jul. 18, 2014 for International Patent Application No. PCT/CN2014/075611, 7 pages.

Office Action dated Nov. 16, 2017 for Chinese Application No. 201310462103.5, 8 pages.

* cited by examiner

| Return | Telephone number filling | Next |

Please input your country code and input your telephone number

Form element of the country name

China

Form element of the country code

+86 | 18532456685

Form element of the telephone number

FIG. 6

| Return | E-mail login |

E-mail address

Password

Login

FIG. 7

METHOD AND DEVICE FOR INPUTTING INFORMATION INTO AN ENTRY FIELD OF AN ELECTRONIC COMMUNICATION

CROSS-REFERENCE TO RELATED APPLICATIONS

This application is a continuation of International Application No. PCT/CN2014/075611, filed on Apr. 17, 2014, which claims priority to Chinese Patent Application No. 201310462103.5, filed on Sep. 29, 2013, both of which are hereby incorporated herein by references in their entireties.

FIELD

The present disclosure relates to the field of Internet communications, and in particular, to a method and a device for inputting account information.

BACKGROUND

With rapid development of Internet technologies, Internet has provided more functions for people. When a user uses a function, the user firstly needs to register a user account of the user in a server on the Internet, and then uses, through the registered user account, the function provided by the Internet.

Currently, when the user needs to register the user account, the server on the Internet sends a registration form to a terminal device of the user, where the registration form includes multiple form elements. The user needs to input account information to the form elements included in the registration form, where the input account information may include information, such as a user account number, a password, an e-mail address, an identity card number, and/or a telephone number. Then, the terminal device sends the account information in the registration form to the server, and the server creates a user account for the user according to the account information.

During the implementation of the present disclosure, the inventor finds that the prior art has at least the following problems:

When the number of form elements included in the registration form is relatively large, the user needs to input account information to each form element, causing a complex operation and reducing efficiency of inputting the user account information.

SUMMARY

To solve the problem in the prior art, embodiments of the present disclosure provide a method and a device for inputting account information. The solutions are as follows:

One aspect provides a method for inputting account information in a terminal device. In the method: the terminal device obtains user account information included in a first application in the terminal device. The terminal device obtains an information type of a form element included in a form of a second application in the terminal device. The terminal device determines account information corresponding to the form element according to the information type of the form element and the user account information. The terminal device then automatically inputs the account information corresponding to the form element to the form element.

A second aspect provides a device for inputting account information. The device includes a hardware processor and a non-transitory storage medium configured to store the following modules: a first obtaining module, configured to obtain user account information included in a first application; a second obtaining module, configured to obtain an information type of a form element included in a form of a second application; a determining module, configured to determine account information corresponding to the form element according to the information type of the form element and the user account information; and an inputting module, configured to automatically input the account information corresponding to the form element to the form element.

In a third aspect, a device for inputting account information is provided. The device includes a hardware processor and a non-transitory storage medium accessible to the hardware processor. The device is configured to: obtain user account information comprised in a first application; obtain an information type of a form element comprised in a form of a second application; determine account information corresponding to the form element according to the information type of the form element and the user account information; and automatically input the account information corresponding to the form element to the form element.

In the embodiments of the present disclosure, before the form of the second application is displayed to a user, the form element included in the form of the second application is pre-filled according to the user account information included in the first application, and when the number of form elements included in the form of the second application is relatively large, complexity of inputting the account information to the form of the second application is reduced, thereby further improving efficiency of inputting the account information, and improving accuracy of inputting the account information.

BRIEF DESCRIPTION OF THE DRAWINGS

To further describe the solutions in the embodiments of the present disclosure, the following briefly introduces the accompanying drawings required for describing the embodiments. Apparently, the accompanying drawings in the following descriptions are merely example embodiments of the present disclosure. A person of ordinary skill in the art may derive other drawings according to the accompanying drawings without creative efforts.

FIG. 3 is a schematic diagram of a user account registration interface according to embodiments of the present disclosure;

FIG. 4 is a schematic diagram of a user account binding interface according to embodiments of the present disclosure;

FIG. 5 is a schematic diagram of a user account login interface according to embodiments of the present disclosure;

FIG. 6 is a schematic diagram of a telephone number filling interface according to embodiments of the present disclosure;

FIG. 7 is a schematic diagram of an e-mail login interface according to embodiments of the present disclosure;

DETAILED DESCRIPTION OF THE DRAWINGS

Figure 1:
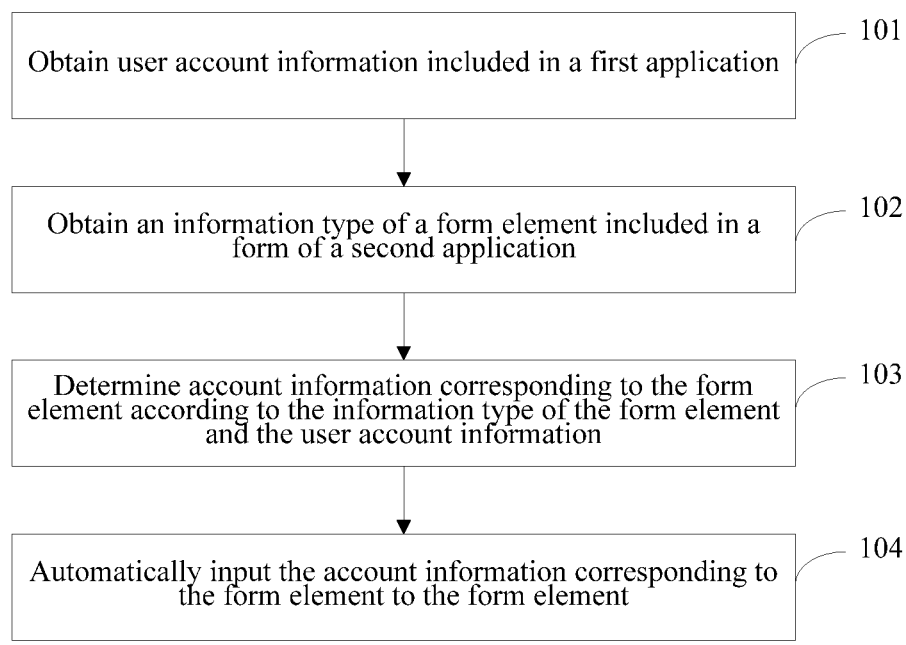
FIG. 1 is a flow chart of a method for inputting account information according to embodiments of the present disclosure.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a terminal device, and a communication network. The server and the terminal device may be coupled through the communication network for information exchange, such as sending/receiving identification information, sending/receiving data files such as splash screen images, etc. Although only one terminal device and one server are shown in the environment, any number of terminal devices or servers may be included, and other devices may also be included.

The communication network may include any appropriate type of communication network for providing network connections to the server and terminal device or among multiple servers or terminal devices. For example, communication network may include the Internet or other types of computer networks or telecommunication networks, either wired or wireless. In a certain embodiment, the disclosed methods and device may be implemented, for example, in a wireless network that includes at least one terminal device.

In some cases, the terminal device may refer to any appropriate user terminal device with certain computing capabilities, such as a personal computer (PC), a work station computer, a server computer, a hand-held computing device (tablet), a smart phone or mobile phone, or any other user-side computing device. In various embodiments, the terminal device may also be referred to as a terminal. In various embodiments, the terminal device may include a network access device. The terminal device may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

To make the objectives, solutions, and advantages of the present disclosure more comprehensible, the following further describes the example embodiments of the present disclosure in detail with reference to the accompanying drawings.

The embodiment of the present disclosure provides a method for inputting account information in a terminal device. Referring to FIG. 1, the method includes:

Step 101: The terminal device obtains user account information included in a first application in the terminal device.

Step 102: The terminal device obtains an information type of a form element included in a form of a second application in the terminal device.

Step 103: The terminal device determines account information corresponding to the form element according to the information type of the form element and the user account information.

Step 104: The terminal device automatically input the account information corresponding to the form element to the form element.

The obtaining user account information included in a first application includes: searching a terminal device to determine whether the user account information included in the first application is stored; if yes, obtaining the user account information included in the first application and stored in the terminal device; and if not, obtaining a user account number and a password that correspond to a user account registered in the first application by the user, and obtaining the user account information from the first application according to the user account number and the password.

Further, after the obtaining the user account information from the first application according to the user account number and the password, the method further includes: storing the obtained user account information.

The determining account information corresponding to the form element according to the information type of the form element and the user account information includes:

determining, according to the information type of the form element, whether corresponding account information exists in the user account information; and if yes, determining the account information corresponding to the information type of the form element as the account information corresponding to the form element.

Further, the method further includes:

if it is determined that the account information corresponding to the information type of the form element does not exist in the user account information, obtaining, from the user account information, account information capable of determining the account information corresponding to the information type of the form element, and determining the account information corresponding to the form element according to the obtained account information.

Preferably, the automatically inputting the account information corresponding to the form element to the form element includes:

if multiple pieces of account information corresponding to the form element exist, creating a blank pull-down list in the form element; and automatically inputting the account information corresponding to the form element to pull-down entries included in the pull-down list.

Preferably, before the automatically inputting the account information corresponding to the form element to the form element, the method further includes:

obtaining an information format of the form element included in the form of the second application.

The automatically inputting the account information corresponding to the form element to the form element includes:

comparing an information format of the account information corresponding to the form element with the information format of the form element;

if they are the same, automatically inputting the account information corresponding to the form element to the form element; and if they are different, converting the information format of the account information corresponding to the form element into the information format of the form element, and automatically inputting the converted account information to the form element.

The form of the second application is a registration form of the second application. Alternatively, the second application may be an online transaction form in online shopping. The second application may be any application that requires the user to input the user information.

In the embodiment of the present disclosure, before the form of the second application is displayed to a user, the form element included in the form of the second application is pre-filled according to the user account information included in the first application, and when the number of the form elements included in the form of the second application is relatively large, complexity of inputting the account information to the form of the second application is reduced, thereby further improving efficiency of inputting the account information, and improving accuracy of inputting the account information.

Figure 2:
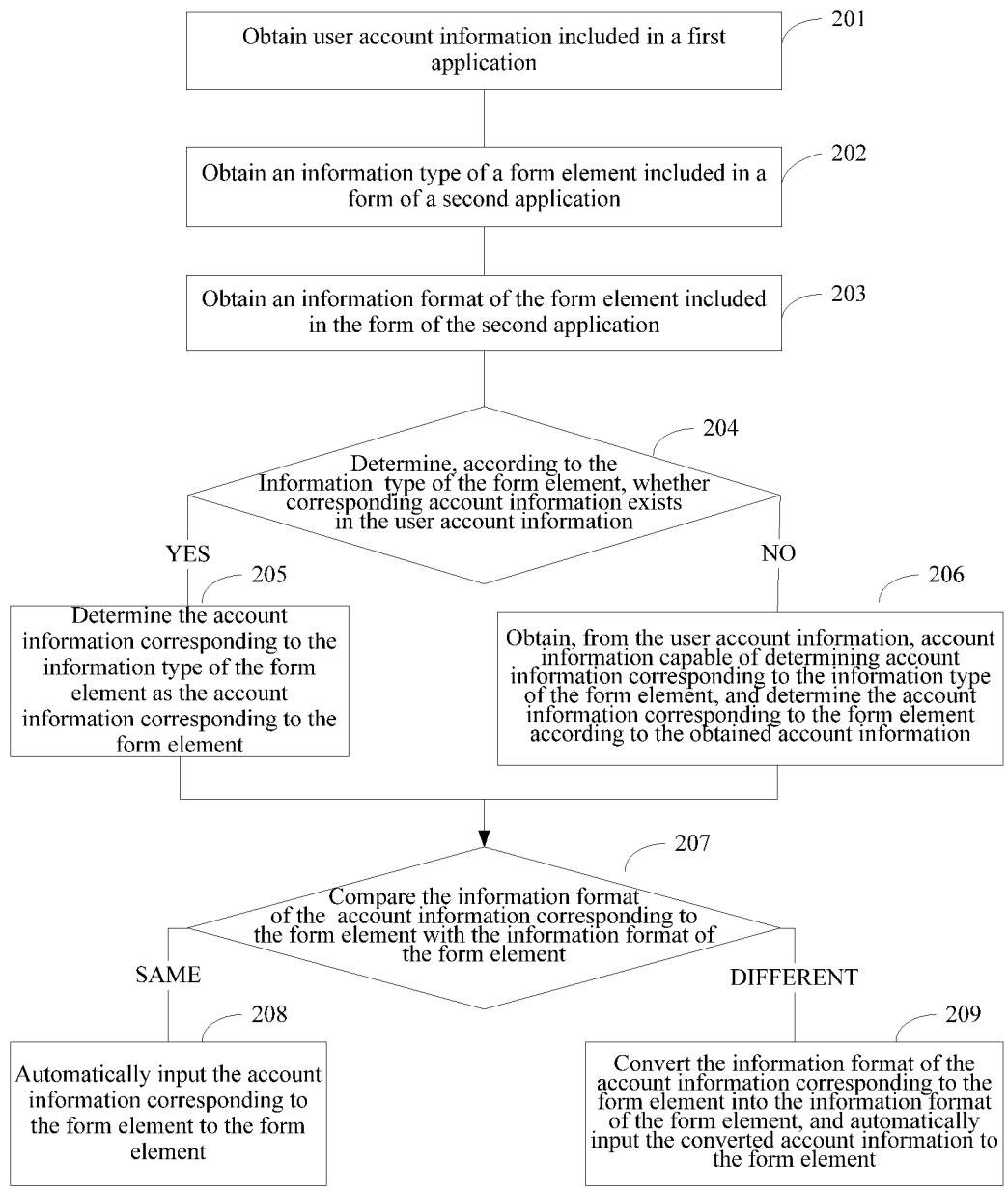
FIG. 2 is a flow chart of a method for inputting account information according to embodiments of the present disclosure.

The embodiment of the present disclosure provides a method for inputting account information. Referring to FIG. 2, the method includes:

Step 201: Obtain user account information included in a first application.

For example, this step may be divided into the following steps (1) to (3), including:

(1). Search a terminal device to determine whether the user account information included in the first application is stored, if yes, perform step (2), and otherwise, perform step (3).

When the user registers a user account in the first application by using the terminal device, the terminal device stores account information of the user account that is registered in the first application by the user; and when the user registers a user account in the first application by using another terminal device, and the user does not access the first application through the user account in the terminal device, the terminal device does not store the user account information included in the first application. For example, when the user registers a user account in a webpage of the first application through a computer, and the user uses a mobile device, such as a mobile phone, the mobile device does not store the user account information included in the first application.

The user account information includes information, such as a user avatar, a nickname, an e-mail address, an identity card number, and/or a telephone number.

(2). Obtain the user account information included in the first application and stored in the terminal device.

In a general case, the terminal device stores account information registered in the first application by one user, that is, the account information of the account registered in the first application by the user; in a special case, the terminal device may store account information registered in the first application by multiple users, that is, the terminal device may also store account information registered in the first application by another user. When the terminal device stores account information registered in the first application by one user, the user account information is obtained from the terminal device directly; when the terminal device stores account information registered in the first application by multiple users, a telephone number of a local device in the terminal device is obtained, user account information in which a same telephone number as the telephone number of the local device exists is obtained, and the obtained user account information is determined as the user account information.

Further, if the telephone number does not exist in the user account information included in the first application and stored in the terminal device, multiple pieces of the user account information stored in the terminal device are obtained. When account information is input to the form element included in the form of the second application, the account information corresponding to the form element included in the multiple pieces of user account information is displayed in a pull-down list of the form element, so that the user selects, from the pull-down list, the account information needing to be input.

(3). Obtain a user account number and a password that correspond to the user account registered in the first application by the user, and obtain the user account information from the first application according to the user account number and the password.

For example, the terminal device receives the user account number and the password that are input by the user and correspond to the user account registered in the first application, and sends the user account number and the password to a first application server. The first application server obtains a corresponding password from a stored mapping relationship between the user account number and the password according to the user account number. If a password input by the user is the same as the obtained password, the first application server obtains corresponding account information from the stored mapping relationship between the user account number and the account information according to the user account number, and sends the obtained account information to the terminal device.

Further, if the password input by the user is different from the obtained password, the first application server sends prompt information of a wrong password to the terminal device, so that the user re-inputs the password of the user account number.

Further, when the terminal device receives the user account information sent by the first application server, the received user account information is stored.

Step 202. Obtain an information type of the form element included in the form of the second application.

The form of the second application includes multiple form elements, and each form element corresponds to one information type.

The form element generally is an element for inputting account information, such as a text box, a list box, a pull-down text box, a password box, a single-selection box, an image selector, a color selector, a date and time selector, and a file upload box.

For example, information types of the text box and the list box may be an e-mail address, a nickname, and a telephone number; an information type of the password box may be a password; an information type of the pull-down text box may be a country name; an information type of the single-selection box may be gender; an information type of the image selector may be an avatar and a background image; an information type of the color selector may be a font color and a background color; an information type of the date and time selector may be a birth date; and an information type of the text upload box may be a photo and a file.

Figure 3:
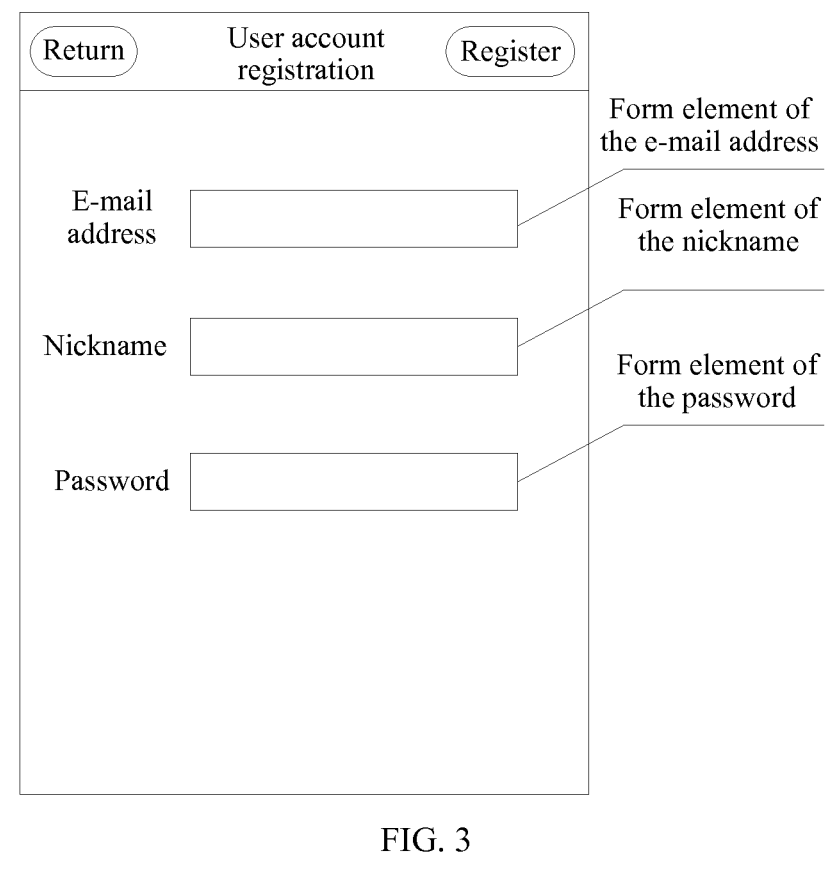
Figures 4, 5:
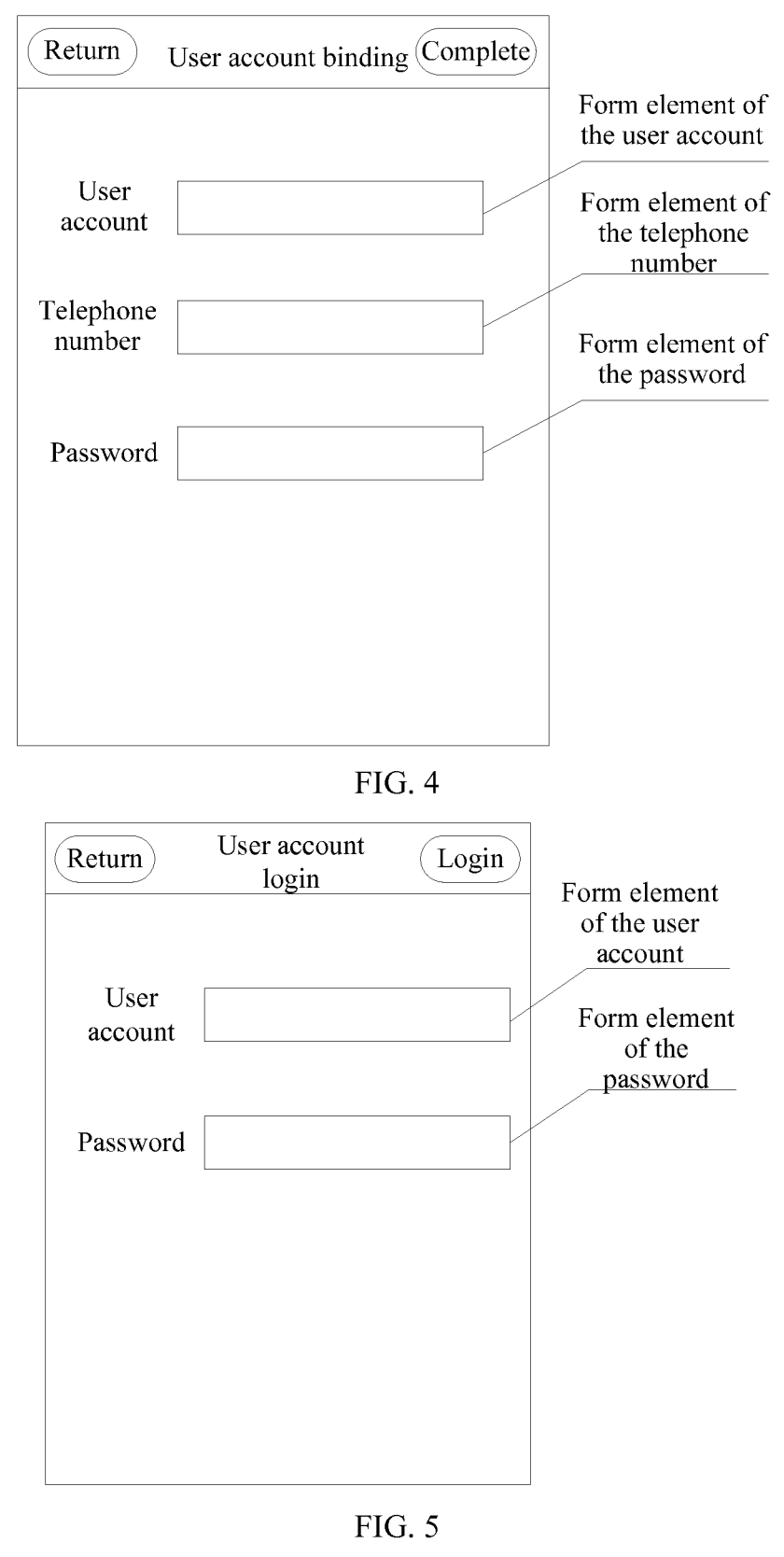

Different services correspond to forms of different second applications, and the forms of the different second applications include different form elements. For example, when the user wants to register a user account, the form of the second application may be a registration form included in the user account registration interface shown in FIG. 3, and the registration form included in FIG. 3 includes a form element of the e-mail address, a form element of the nickname, and a form element of the password. When the user wants to bind the user account with certain contact information, the form of the second application may be a binding form included in the user account binding interface shown in FIG. 4. Assuming that the user wants to bind the user account with his telephone, the binding form included in FIG. 4 includes a form element of a user account number, a form element of the password, and a form element of the telephone number. When the user wants to log into a user account, the form of the second application may a login form included in the user account login interface shown in FIG. 5, and the login form included in FIG. 5 includes a form element of the user account number and a form element of the password.

Step 203. Obtain an information format of the form element included in the form of the second application.

Each form element has a preset information format, for example, an information format of the birth date may be "year-month-date", "year. month. date", and/or "year/month/date". Assuming that the birth date is Nov. 5, 1990, the birth date may be represented as 1990-11-05 according to the format "year-month-date", may be represented as 1990.11.05 according to the format "year. month. date", and may be represented as 1990/11/05 according to the format "year/month/date".

Step 204. For any form element included in the form of the second application, determine, according to the information type of the form element, whether corresponding account information exists in the user account information, if yes, perform step 205, and otherwise, perform step 206.

For example, an information type of each piece of account information included in the user account information is obtained, and the information type of the form element is compared with the obtained information type. If the information type of the form element exists in the obtained information type, it is determined that account information corresponding to the information type of the form element exists in the user account information, and otherwise, it is determined that the account information corresponding to the information type of the form element does not exist in the user account information.

The account information of each form element included in the form of the second application may not exist in the user account information, but account information of a form element included in the form of the second application may be determined through the user account information. For example, an identity card number of the user exists in the user account information, and a birth date and a constellation of the user do not exist in the user account information, then the birth date of the user can be determined according to a composition structure of the identity card number of the user, and the constellation of the user is determined according to the birth date of the user.

Step 205. Determine the account information corresponding to the information type of the form element as the account information corresponding to the form element, and perform step 207.

Step 206. Obtain, from the user account information, account information capable of determining account information corresponding to the information type of the form element, and determine the account information corresponding to the form element according to the obtained account information.

For example, the account information capable of determining the account information corresponding to the information type of the form element is determined from the user account information, and whether the account information corresponding to the information type of the form element exists in the determined account information is determined. If the account information exists, the account information corresponding to the information type of the form element is obtained from the determined account information, and the obtained account information is used as the account information corresponding to the form element; and if the account information does not exist, the account information corresponding to the form element is determined according to the determined account information.

For example, the information type of the form element is the "birth date", the information type capable of determining the account information corresponding to the "birth date" is the "identity card number". The account information corresponding to the "identity card number" obtained from the user account information is 426421198911028964, it is determined that the account information corresponding to the "birth date" exists in the obtained account information 426421198911028964, then the account information corresponding to the "birth date" obtained from the obtained account information 426421198911028964 is 19891102. If the information type of the form element is the "constellation", the information type capable of determining the account information corresponding to the "constellation" is determined as the "identity card number", the account information corresponding to the "identity card number" obtained from the user account information is 42642-1198911028964, and it is determined that the account information corresponding to the "constellation" does not exist in the obtained account information 426421198911028964, and then the "birth date" obtained from the obtained account information 426421198911028964 is 19891102, a constellation range of the birth date is determined according to the "birth date" 19891102, and the account information corresponding to the "constellation" is determined as Sagittarius according to the determined constellation range.

For another example, the form of the second application is the form for writing a telephone number. An information type of a form element included in the form is the "country name", the "country code", and the "telephone number". Because the user account information do not have the account information corresponding to the "country name" and the "country code", an information type capable of determining the account information corresponding to the "country name" and the "country code" is determined as the "telephone number", the account information corresponding to the "telephone number" obtained from the user account information is 18532456685, and the account information corresponding to the "country name" is determined as China according to the obtained account information 18532-456685; and the account information corresponding to the "country code" is +86, China which the account information corresponding to the "country name" is determined as is automatically input to the form element of the country name in a telephone number writing interface shown in FIG. 6, and +86 that is the account information corresponding to the "country code" is automatically input to the form element of the country code in the telephone number filling interface shown in FIG. 6.

Step 207. Compare the information format of the account information corresponding to the form element with the information format of the form element, if they are the same, perform step 208, and otherwise, perform step 209.

If the information format of the input account information is different from the information format of the form element, it is caused that the account information is re-input to the form element, thereby reducing a success rate of inputting the account information. Therefore, in the embodiment of the present disclosure, the terminal device obtains, from the user account information, the account information corresponding to the form element included in form of the second application, it is determined whether the information format of the obtained account information is the same as the information format of the form element, if they are different, the information format of the obtained account information is converted into the information format of the form element, thereby improving the success rate of inputting the account information.

Step 208. Automatically input the account information corresponding to the form element to the form element, and end the operation.

If the form element corresponds to one piece of account information, the account information corresponding to the form element is automatically input to the form element directly. If the form element corresponds to multiple pieces of account information, a blank pull-down list is created in the form element, and the account information corresponding to the form element is automatically input to pull-down entries included in the pull-down list.

After the account information corresponding to the form element is automatically input to the pull-down entries included in the pull-down list, the form of the second application is displayed to the user, so that the user selects, from the pull-down entries included in the pull-down list, the account information needing to be input, and after the user selects, from the pull-down list, the account information needing to be input, the pull-down list is withdrawn.

In the embodiment of the present disclosure, the terminal device automatically obtains the user account information included in the first application, obtains corresponding account information from the user account information included in the first application according to the information type of the form element included in the form of the second application, and automatically inputs the obtained account information to the form element. When the number of form elements included in the form of the second application is relatively large, the terminal device automatically inputs the account information to the form element included in the form in advance, so that the amount of information manually input to the form element included in the form is reduced, thereby reducing complexity of inputting the account information to the form element included in the form, and improving efficiency of inputting the account information to the form element included in the form.

Figure 8:
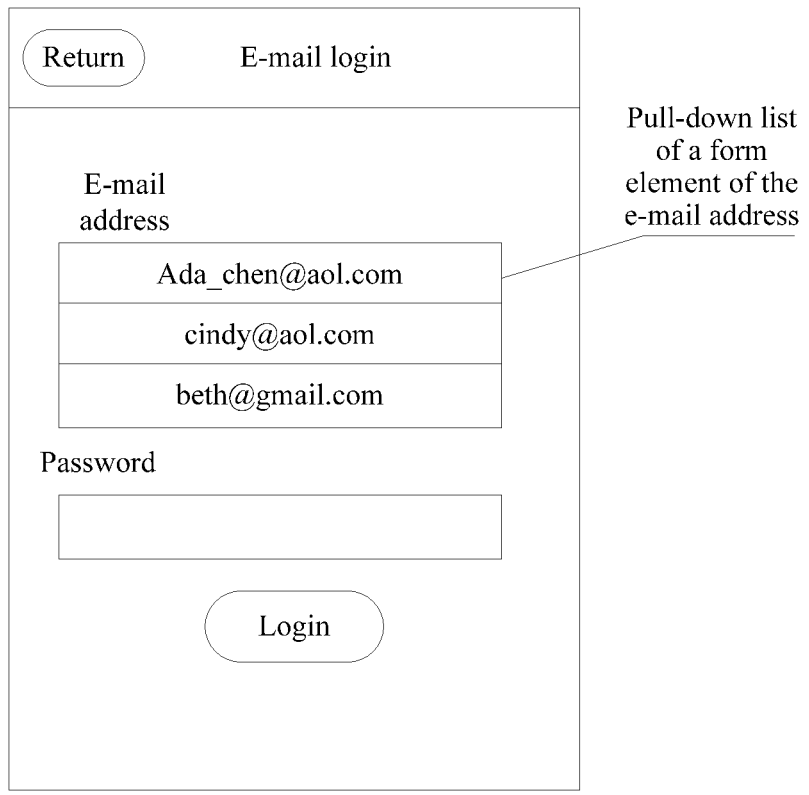
FIG. 8 is schematic diagram of another e-mail login interface according to embodiments of the present disclosure.

For example, the form of the second application is an e-mail login form, in an e-mail login interface shown in FIG. 7, an information type of the form element included in the e-mail login form is the "e-mail address" and the "password". Assuming that the user account information includes three e-mail addresses, namely, Ada_chen@aol.com, cindy@aol.com, and beth@gmail.com, a blank pull-down list is created in the form element corresponding to the "e-mail address", the three e-mail addresses are automatically input to pull-down entries included in the pull-down list of the form element of the "e-mail address" in the login interface shown in FIG. 8.

Step 209. Convert the information format of the account information corresponding to the form element into the information format of the form element, and automatically input the converted account information to the form element.

Further, if multiple pieces of account information corresponding to the form element exist, the information formats of the multiple pieces of account information are converted into the information format of the form element, and a blank pull-down list is created in the form element, and the converted multiple pieces of account information are automatically input to pull-down entries included in the pull-down list.

Because the user account information may not include all account information of the form element included in the form of the second application, after the form element included in the form of the second application is filled according the user account information, the form of the second application is displayed to the user, so that the user inputs corresponding account information to other form elements included in the form of the second application except the form element to which the account information has been input.

Preferably, when the form of the second application is displayed to the user, the account information already input to the form of the second application is selected, in this case, when the user wants to modify the input account information, the user does not need to select the input account information, and instead, deletes and modifies the input account information.

For any one of other form elements, same as the form element, the foregoing step 204 to step 209 are performed to obtain account information corresponding to any one of other form elements, and input the account information to any one of other form elements.

For example, the account information of the obtained "birth date" is 19891102, the account information 19891102 has an information format different from the information format of the form element corresponding to the "birth date". After the information format of the account information 19891102 is converted into the information format of the form element, the converted account information is 1989-11-02, and the converted account information 1989-11-02 is automatically input to the form element.

In the embodiment of the present disclosure, before the form of the second application is displayed to the user, the form element included in the form of the second application is pre-filled according to the user account information included in the first application, and when the number of the form elements included in the form of the second application is relatively large, complexity of inputting the account information to the form of the second application is reduced, thereby further improving efficiency of inputting the account information, and improving accuracy of inputting the account information.

Figure 9:
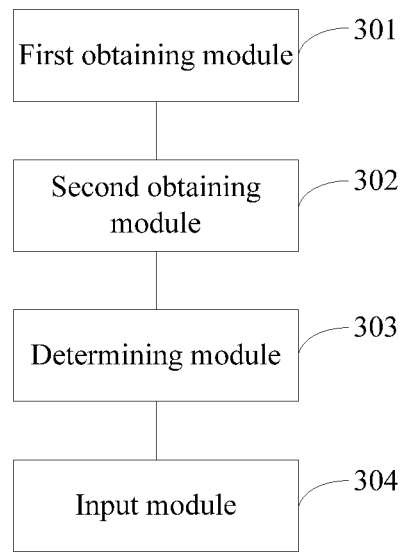
FIG. 9 is a schematic structural diagram of a device for inputting account information according to embodiments of the present disclosure.

Referring to FIG. 9, the embodiment of the present disclosure provides a device for inputting account information, where the device may be a terminal device that includes:

a first obtaining module 301, configured to obtain user account information included in a first application;

a second obtaining module 302, configured to obtain an information type of a form element included in a form of a second application;

a determining module 303, configured to determine account information corresponding to the form element according to the information type of the form element and the user account information; and an inputting module 304, configured to automatically input the account information corresponding to the form element to the form element.

The first obtaining module 301 includes:

a searching unit, configured to search a terminal device to determine whether the user account information included in the first application is stored;

a first obtaining unit, configured to: if yes, obtain the user account information included in the first application and stored in the terminal device; and a second obtaining unit, configured to: if not, obtain a user account number and a password that correspond to a user account registered in the first application by the user, and obtain the user account information from the first application according to the user account number and the password.

Further, the first obtaining module 301 further includes: a storage unit, configured to store the obtained user account information.

The determining module 303 includes: a first determining unit, configured to determine, according to the information type of the form element, whether corresponding account information exists in the user account information; and a second determining unit, configured to: if the account information exists, determine account information corresponding to the information type of the form element as the account information corresponding to the form element.

Further, the device further includes: a judging module, configured to: if it is determined that the account information corresponding to the information type of the form element does not exist in the user account information, obtain, from the user account information, account information capable of determining the account information corresponding to the information type of the form element, and determine the account information corresponding to the form element according to the obtained account information.

The inputting module 304 includes: a creation unit, configured to: if multiple pieces of account information corresponding to the form element exist, create a blank pull-down list in the form element; and a first inputting unit, configured to automatically input the account information corresponding to the form element to pull-down entries included in the pull-down list.

Preferably, the device further includes: a third obtaining module, configured to obtain an information format of the form element included in the form of the second application.

The inputting module 304 includes: a comparing unit, configured to compare an information format of the account information corresponding to the form element with the information format of the form element; a second inputting unit, configured to: if they are the same, automatically input the account information corresponding to the form element to the form element; and a conversion unit, configured to: if they are different, convert the information format of the account information corresponding to the form element into the information format of the form element, and automatically input the converted account information to the form element.

The form of the second application is a registration form of the second application.

In the embodiment of the present disclosure, before the form of the second application is displayed to the user, the form element included in the form of the second application is pre-filled according to the user account information included in the first application, and when the number of the form elements included in the form of the second application is relatively large, complexity of inputting the account information to the form of the second application is reduced, thereby further improving efficiency of inputting the account information, and improving accuracy of inputting the account information.

Figure 10:
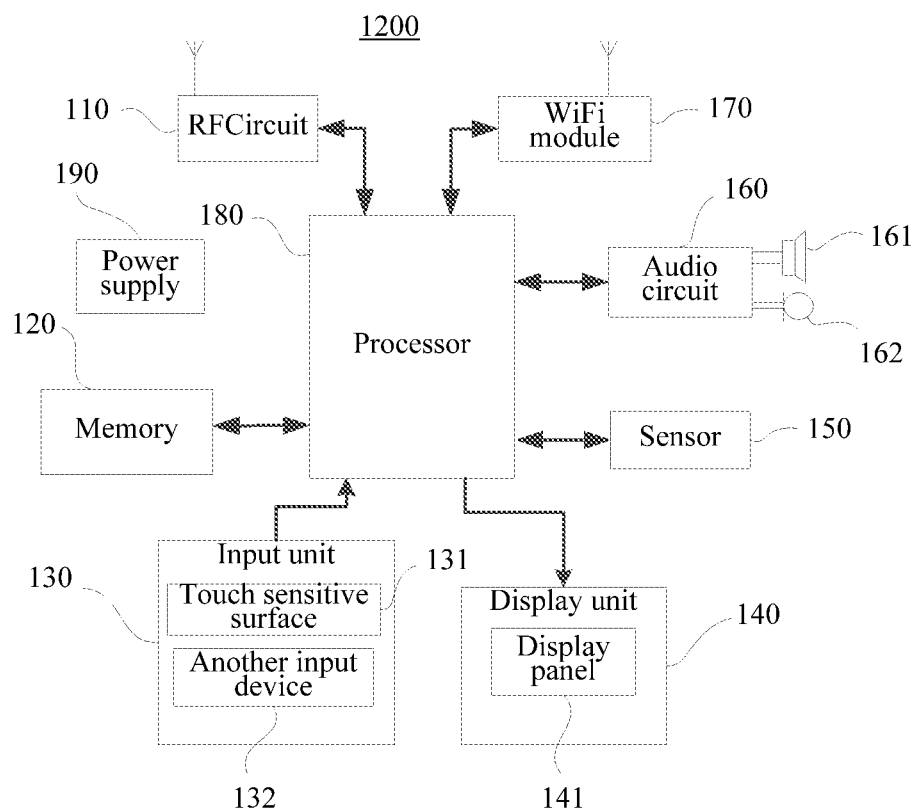
FIG. 10 is schematic structural diagram of a terminal device for inputting account information according to embodiments of the present disclosure.

Please refer to FIG. 10, which shows a schematic structural diagram of a terminal device that has a touch-sensitive surface and is involved in the embodiment of the present disclosure. The terminal device may be any device configured to implement the method for inputting account information provided by the foregoing embodiments.

For example, the terminal device 1200 may include components, such as an RF (Radio Frequency, radio frequency) circuit 110, a memory 120 including one or more computer readable storage media, an inputting unit 130, a displaying unit 140, a sensor 150, an audio circuit 160, a WiFi (wireless fidelity, wireless fidelity) module 170, a processor 180 including one or more processing cores, and a power supply 190. A person skilled in the art may understand that, the terminal device structure shown in FIG. 10 does not limit the terminal device, and may include more components or less components than those shown in the figure, or may combine some components, or employ a different component arrangement.

The RF circuit 110 may be configured to: in a process of transceiving information or calling, receive and send a signal, especially, after receiving downlink information of a base station, deliver it to one or more processors 180 for processing, and in addition, send uplink data to the base station. Generally, the RF circuit 110 includes but is not limited to an antenna, at least one amplifier, a tuner, one or more oscillators, a subscriber identity module (SIM) card, a transceiver, a coupler, an LNA (Low Noise Amplifier), and a duplexer. In addition, the RF circuit 110 may also communicate with a network and another device through wireless communication. The wireless communication may use any communication standard or protocol, which includes but is not limited to a GSM (Global System of Mobile communication), GPRS (General Packet Radio Service), CDMA (Code Division Multiple Access), WCDMA (Wideband Code Division Multiple Access), LTE (Long Term Evolution), an e-mail, an SMS (Short Messaging Service).

The memory 120 may be configured to store a software program and modules. The memory 120 may include a non-transitory storage medium configured to implement the above methods. The memory 120 may also include a transitory storage medium to store at least one of the above modules.

The processor 180 performs various function applications and data processing by running the software program and modules stored in the memory 120. The memory 120 may mainly include a program storage region and a data storage region. The program storage region may store an operating system, an application program required for at least one function (such as a voice playing function, and an image playing function), and the like. The data storage region may store data (such as audio data and a contact book) that is created according to usage of the terminal device 1200. In addition, the memory 120 may include a high speed random access memory, and may also include a non-volatile memory, such as at least one magnetic storage device, a flash drive, or another non-volatile solid-state storage device. Correspondingly, the memory 120 may also include a memory controller, so that the processor 180 and the inputting unit 130 access the memory 120.

The inputting unit 130 may be configured to receive input number or character information, and generate keyboard signal input, mouse signal input, operation rod signal input, optical signal input or trackball signal input that is related to a user setting and function control. For example, the inputting unit 130 may include a touch-sensitive surface 131, and another inputting device 132. The touch-sensitive surface 131 may be called as a touch display screen or a touch panel, and may collect a touch operation (such as an operation of a user on or near the touch-sensitive surface 131 by using any suitable object or attachment such as a finger and a touch pen) of a user on or near the touch-sensitive surface, and drive a corresponding connection device according to a preset program. Optionally, the touch-sensitive surface 131 may include two parts, namely, a touch detection device and a touch controller. The touch detection device detects a touch direction of the user, detects a signal brought by the touch operation, and sends the signal to the touch controller. The touch controller receives touch information from the touch detection device, converts the touch information into coordinates of a touch point, sends the coordinates to the processor 180, and receives and performs a command sent by the processor 180. In addition, various types, such as a resistance-type, a capacitance-type, an infrared ray, and a surface acoustic wave, are used to implement the touch-sensitive surface 131. Apart from the touch-sensitive surface 131, the inputting unit 130 may also include another inputting device 132. For example, another inputting device 132 may include but is not limited to one or more of a physical keyboard, a function key (such as a volume control key, an on/off key), a trackball, a mouse, an operation rod, and the like.

The displaying unit 140 may be configured to display the information input by the user, or information provided for the user, and various image user interfaces of the terminal device 1200, where the image user interfaces may be formed by an image, a text, an icon, a video, and any combination thereof. The displaying unit 140 may include a display panel, and optionally, forms, such as LCD (Liquid Crystal Display), and OLED (Organic Light-Emitting Diode), are used to configure the display panel 141. Further, the touch-sensitive surface 131 may cover the display panel 141. After the touch-sensitive surface 131 detects a touch operation on or near the touch-sensitive surface, the touch-sensitive surface sends the operation to the processor 180 to determine a type of a touch event. Then the processor 180 provides corresponding visual output on the display panel 141 according to the type of the touch event. Although, in FIG. 10, the touch-sensitive surface 131 and the display panel 141 are used as two separate components to implement input and output functions, in some embodiments of the present disclosure, the touch-sensitive surface 131 and the display panel 141 may be integrated to implement the input and output functions.

The terminal device 1200 may further include at least one sensor 150, such as an optical sensor, a motion sensor, and another sensor. For example, the optical sensor may include an ambient light sensor and a proximity sensor. The ambient light sensor may adjust luminance of the display panel 141 according to luminance of the ambient light, and the proximity sensor may switch off the display panel 141 and/or backlight when the terminal device 1200 is moved to an ear. As one motion sensor, a gravity accelerometer may detect a value of acceleration at each direction (which generally is triaxial), and may detect a value and a direction of the gravity when being static, and may be configured to identify an application of a mobile phone posture (such as horizontal-vertical screen switchover, related games, and magnetometer posture calibration), and identity related functions (such as a pedometer, and knocking) through vibration. Other sensors, such as a gyroscope, a barometer, a hygrometer, a thermometer, and an infrared sensor, which may be configured for the terminal device 1200 are not described herein again.

The audio circuit 160, a louder speaker 161, and a microphone 162 may provide an audio interface between the user and the terminal device 1200. The audio circuit 160 may transmit, to the louder speaker 160, an electric signal converted from the audio data, and the louder speaker 161 converts the electric signal into a voice signal and outputs the voice signal. In another aspect, the microphone 162 converts the collected voice signal into an electric signal, the audio circuit 160 receives the electric signal and converts it into audio data, and then output the audio data to the processor 180 for processing. After processing of the processor 180, the audio data is sent through the RF circuit 110 to another terminal device, or the audio data is output to the memory 120 for further processing. The audio circuit 160 may further include an earplug jack, so as to provide communication between an earphone and the terminal device 1200.

WiFi belongs to a short-distance wireless transmission technology, the terminal device 1200 may help, through the WiFi module 170, the user to transceive an e-mail, browse a webpage, and access stream media, and the like, which provides wireless broadband Internet access for the user. Although FIG. 10 shows the WiFi module 170, it may be understood that, the WiFi module does not belong to a necessary composition of the terminal device 1200, and may be ignored according to needs within the range of the essence of the present disclosure.

The processor 180 is a control center of the terminal device 1200, connects all parts of the entire mobile phone by using various interfaces and lines, and performs various functions of the terminal device 1200 and processes data by running or performing the software program and/or module stored in the memory 120 and invoking data stored in the memory 120, thereby implementing entire monitoring on the mobile phone. Optionally, the processor 180 may include one or more processing cores; optionally, the processor 180 may integrate an application processor and a modem processor. The application processor mainly processes an operating system, a user interface, and an application program, and the modem processor mainly processes wireless communication. It is also known that the modem processor may not be integrated into the processor 180.

The terminal device 1200 may further include a power supply 190 (such as a battery) for supplying power to each component. Preferably, the power supply may be logically connected with the processor 180 by using a power management system, thereby implementing functions, such as charging, discharging, and power consumption management, by using the power management system. The power supply 190 may further include any component, such as one or more direct current or alternating current power supply, a recharging system, a power fault detection circuit, a power adapter or inverter, and a power state indicator.

Although not shown in the figure, the terminal device 1200 may also include a camera, a Bluetooth module, and the like, which are not described herein again. For example, in this embodiment, the displaying unit of the terminal device is a touch screen display, and the terminal device further includes a memory, and one or more programs. The one or more programs are stored in the memory, and one or more processors are configured to perform the one or more programs, which includes an instruction for performing the following operations:

obtaining user account information included in a first application;

obtaining an information type of a form element included in a form of a second application;

determining account information corresponding to the form element according to the information type of the form element and the user account information; and automatically inputting the account information corresponding to the form element to the form element.

Assuming that the foregoing is a first possible implementation manner, in a second possible implementation manner provided based on the first possible implementation manner, the memory of the terminal device further includes an instruction for performing the following operations:

searching the terminal device to determine whether the user account information included in the first application is stored;

if yes, obtaining the user account information included in the first application and stored in the terminal device; and if not, obtaining a user account number and a password that correspond to a user account registered in the first application by the user, and obtaining the user account information from the first application according to the user account number and the password.

In a third possible implementation manner provided based on the second possible implementation manner, the memory of the terminal device further includes an instruction for performing the following operations:

storing the obtained user account information.

In a fourth possible implementation manner provided based on the first possible implementation manner, the memory of the terminal device further includes an instruction for performing the following operations:

determining, according to the information type of the form element, whether corresponding account information exists in the user account information; and if yes, determining the account information corresponding to the information type of the form element as the account information corresponding to the form element.

In a fifth possible implementation manner provided based on the fourth possible implementation manner, the memory of the terminal device further includes an instruction for performing the following operations:

if it is determined that the account information corresponding to the information type of the form element does not exist in the user account information, obtaining, from the user account information, account information capable of determining the account information corresponding to the information type of the form element, and determining the account information corresponding to the form element according to the obtained account information.

In a sixth possible implementation manner provided based on the first possible implementation manner, the memory of the terminal device further includes an instruction for performing the following operations:

if multiple pieces of account information corresponding to the form element exist, creating a blank pull-down list in the form element; and automatically inputting the account information corresponding to the form element to pull-down entries included in the pull-down list.

In a seventh possible implementation manner provided based on the first possible implementation manner, the memory of the terminal device further includes an instruction for performing the following operations:

obtaining an information format of the form element included in the form of the second application; and the automatically inputting the account information corresponding to the form element to the form element includes:

comparing an information format of the account information corresponding to the form element with the information format of the form element;

if they are the same, automatically inputting the account information corresponding to the form element to the form element; and if they are different, converting the information format of the account information corresponding to the form element into the information format of the form element, and automatically inputting the converted account information to the form element.

In an eighth possible implementation manner provided based on any one of the first possible implementation manner to the seventh possible implementation manner, the memory of the terminal device further includes an instruction for performing the following operations:

the form of the second application is a registration form of the second application.

In the embodiment of the present disclosure, before the form of the second application is displayed to a user, the form element included in the form of the second application is pre-filled according to the user account information included in the first application, and when the number of the form elements included in the form of the second application is relatively large, complexity of inputting the account information to the form of the second application is reduced, thereby further improving efficiency of inputting the account information, and improving accuracy of inputting the account information.

The embodiment of the present disclosure provides a computer readable storage medium. The computer readable storage medium may be a computer readable storage medium included in the memory in the foregoing embodiment; and may also be a computer readable storage medium that exists separately and is not assembled into the terminal device. The computer readable storage medium stores one or more programs, and the one or more programs are used by one or more processors to perform the above disclosed method for inputting account information.

It should be noted that, when the device for inputting account information provided by the foregoing embodiments inputs the account information, division of the foregoing functional modules is used as an example for description. In an actual application, the function division may be implemented by different functional modules according to needs, that is, an internal structure of the device is divided into different functional modules, so as to implement all or a part of the functions. In addition, the device for inputting the account information provided by the foregoing embodiments has a same idea with the method embodiment for inputting account information. For the specific implementation processes, refer to the method embodiment, which is not described herein again.

The embodiment sequence numbers of the present disclosure are merely for description, and do not represent preference of the embodiments.

A person of ordinary skill in the art may understand that all or a part of the embodiments may be implemented through hardware, and may also be implemented by a program instructing relevant hardware. The program may be stored in a computer readable storage medium. The foregoing storage medium may be a read-only memory, a magnetic disk, or an optical disc or the like.

The foregoing descriptions are merely exemplary embodiments of the present disclosure, and are not used for limiting the present disclosure. Any modification, equivalent replacement, and modification made within the spirit and the principle of the present disclosure shall fall within the protection scope of the present disclosure.

What is claimed is:

1. A method for inputting account information, comprising:

obtaining, by a terminal device, user account information corresponding to a first application stored in the terminal device;

obtaining, by the terminal device, an information type of a form element included in a form of a second application running on the terminal device, wherein the second application is different from the first application;

determining, by the terminal device, whether direct account information having a same information type as the form element included in the form of the second application exists in the user account information;

when the direct account information having the same information type as the form element included in the form of the second application is determined to exist in the user account information:

extracting the direct account information having the same information type as the form element included in the form of the second application from the user account information, wherein the direct account information having the same information type as the form element included in the form of the second application is a portion of the user account information; and determining the direct account information having the same information type as the form element included in the form of the second application to be account information corresponding to the form element;

when the direct account information having the same information type as the form element included in the form of the second application is determined not to exist in the user account information:

determining relatable account information having an informative information type corresponding to fillable information of the form element is included in the user account information;

obtaining, from the user account information, the relatable account information, wherein the informative information type of the relatable account information is a different information type from the information type of the form element; and determining the fillable information from the relatable account information to be the account information, based on the fillable information having the same information type as the information type of the form element;

obtaining a first information format corresponding to the form element;

obtaining a second information format corresponding to the account information;

comparing the second information format with the first information format;

when the second information format is determined to be different from the first information format:

generating a converted account information by converting the second information format into the first information format; and prior to displaying the form of the second application, automatically inputting, by the terminal device, the converted account information into the form element;

when the second information format is determined to be the same as the first information format:

prior to displaying the form of the second application, automatically inputting, by the terminal device, the account information into the form element; and displaying, on the terminal device, the form of the second application.

2. The method according to claim 1, wherein obtaining user account information corresponding to the first application comprises:

searching the terminal device to determine whether the user account information comprised in the first application is stored;

when the user account information corresponding to the first application is determined to be stored in the terminal device, obtaining the user account information comprised in the first application and stored in the terminal device; and when the user account information corresponding to the first application is determined not to be stored in the terminal device, obtaining a user account number and a password that correspond to a user account registered in the first application by the user, and obtaining the user account information from the first application according to the user account number and the password.

3. The method according to claim 2, wherein after the obtaining the user account information from the first application according to the user account number and the password, the method further comprises:
storing the obtained user account information.

4. The method according to claim 1, wherein automatically inputting the account information into the form element comprises:
when multiple pieces of account information corresponding to the form element exist, creating a blank pull-down list in the form element; and
automatically inputting the account information corresponding to the form element to pull-down entries comprised in the pull-down list.

5. The method according to claim 1, wherein the form of the second application is a registration form of the second application.

6. A terminal device for inputting account information, comprising a hardware processor and a non-transitory storage medium accessible to the processor, the non-transitory storage medium comprising processor executable instructions that, when executed by the processor, cause the processor to:
control a first obtaining module to obtain user account information corresponding to a first application stored in the terminal device;
control a second obtaining module to obtain an information type of a form element comprised in a form of a second application in the terminal device, wherein the second application is different from the first application;
control a first determining unit to determine whether direct account information having a same information type as the form element included in the form of the second application exists in the user account information;
control, when the direct account information having the same information type as the form element included in the form of the second application is determined to exist in the user account information, a second determining unit to:
extract the direct account information having the same information type as the form element included in the form of the second application from the user account information, wherein the direct account information having the same information type as the form element included in the form of the second application is a portion of the user account information; and
determine the direct account information having the same information type as the form element included in the form of the second application to be account information corresponding to the form element;
control, when the direct account information having the same information type as the form element included in the form of the second application is determined not to exist in the user account information, a judging module to:
determine relatable account information having an informative information type corresponding to fillable information of the form element is included in the user account information;
obtain, from the user account information, the relatable account information, wherein the informative information type of the relatable account information is a different information type from the information type of the form element; and determine the fillable information from the relatable account information to be the account information, based on the fillable information having the same information type as the information type of the form element;
control a third obtaining module to obtain a first information format corresponding to the form element and obtain a second information format corresponding to the account information;
control a comparison unit to:
compare the second information format with the first information format;
control an inputting module to:
when the second information format is determined to be different from the first information format:
generate a converted account information by converting the second information format into the first information format; and
prior to displaying the form of the second application, automatically input, by the terminal device, the converted account information into the form element;
when the second information format is determined to be the same as the first information format:
prior to displaying the form of the second application, automatically input, by the terminal device, the account information into the form element; and
control a display module to display the form of the second application.

7. The terminal device according to claim 6, wherein the first obtaining module comprises:
a searching unit, configured to search the terminal device to determine whether the user account information corresponding to the first application is stored;
a first obtaining unit, configured to:
when the user account information corresponding to the first application is determined to be stored in the terminal device, obtain the user account information comprised in the first application and stored in the terminal device; and
a second obtaining unit, configured to:
when the user account information corresponding to the first application is determined not to be stored in the terminal device, obtain a user account number and a password that correspond to a user account registered in the first application by the user, and obtain the user account information from the first application according to the user account number and the password.

8. The terminal device according to claim 7, wherein the first obtaining module further comprises:
a storage unit, configured to store the obtained user account information.

9. The terminal device according to claim 6, wherein the inputting module comprises:
a creation unit, configured to:
when multiple pieces of account information corresponding to the form element exist, create a blank pull-down list in the form element; and
a first inputting unit, configured to automatically input the account information corresponding to the form element to pull-down entries comprised in the pull-down list.

10. The terminal device according to claim 6, wherein the form of the second application is a registration form of the second application.

11. A terminal device for inputting account information, comprising a hardware processor and a non-transitory storage medium accessible to the processor, the terminal device is configured to:
- obtain user account information corresponding to a first application stored in the terminal device;
- obtain an information type of a form element included in a form of a second application running on the terminal device, wherein the second application is different from the first application;
- determine whether direct account information exists in the user account information that has a same information type as the form element included in the form of the second application;
- when the direct account information having the same information type as the form element included in the form of the second application is determined to exist in the user account information:
  - extract the direct account information having the same information type as the form element included in the form of the second application from the user account information, wherein the direct account information having the same information type as the form element included in the form of the second application is a portion of the user account information; and
  - determine the direct account information having the same information type as the form element included in the form of the second application to be account information corresponding to the form element;
- when the direct account information having the same information type as the form element included in the form of the second application is determined not to exist in the user account information:
  - determine relatable account information having an informative information type corresponding to fillable information of the form element is included in the user account information;
  - obtain, from the user account information, the relatable account information, wherein the informative information type of the relatable account information is that has a different information type from the information type of the form element; and
  - determine the fillable information from the relatable account information to be the account information, based on the fillable information having the same information type as the information type of the form element;
- obtain a first information format corresponding to the form element and obtain a second information format corresponding to the account information;
- compare the second information format with the first information format;
- when the second information format is determined to be different from the first information format:
  - generate a converted account information by converting the second information format into the first information format; and
  - prior to displaying the form of the second application, automatically input, by the terminal device, the converted account information into the form element;
- when the second information format is determined to be the same as the first information format:
- prior to displaying the form of the second application, automatically input, by the terminal device, the account information into the form element; and
- display the form of the second application.

12. The terminal device according to claim 11, wherein the terminal device is further configured to:
- determine whether the user account information comprised in the first application is stored in the terminal device;
- when the user account information corresponding to the first application is determined to be stored in the terminal device, obtain the user account information comprised in the first application and stored in the terminal device; and
- when the user account information corresponding to the first application is determined not to be stored in the terminal device, obtain a user account number and a password that correspond to a user account registered in the first application by the user, and obtain the user account information from the first application according to the user account number and the password.

13. The terminal device according to claim 11, wherein the form of the second application is a registration form of the second application.

* * * * *